United States Patent [19]

Butler et al.

[11] 4,271,870
[45] Jun. 9, 1981

[54] METHOD AND APPARATUS FOR BLOCKING THE FLOW OF FLUIDS THROUGH AN ELONGATED PIPE SECTION

[76] Inventors: Johnny L. Butler, 1200 Northwood, #212, Baytown, Tex. 77520; Joe L. Valigura, Jr., P.O. Box 1286, Anahuac, Tex. 77514

[21] Appl. No.: 35,309

[22] Filed: May 2, 1979

[51] Int. Cl.³ .................... F16L 55/10; F16L 55/18
[52] U.S. Cl. .................... 138/94.3; 137/318; 138/97; 285/15; 285/368; 285/412
[58] Field of Search ............ 138/89, 94, 94.3, 97, 138/98; 285/15, 368, 412, 45, 363; 137/318

[56] References Cited

U.S. PATENT DOCUMENTS

| | | | |
|---|---|---|---|
| 2,600,497 | 6/1952 | Hamer | 138/94.3 |
| 2,840,100 | 6/1958 | Stephenson | 137/318 |
| 3,687,166 | 8/1972 | Herrin | 138/94 |
| 3,703,906 | 11/1972 | Ticket | 137/318 |
| 3,833,020 | 9/1974 | Smith | 138/94 |
| 3,863,667 | 2/1975 | Ward | 138/94.3 |
| 3,867,964 | 2/1975 | Gardner | 138/94 |
| 3,907,049 | 9/1975 | Baffas | 285/45 |
| 4,018,420 | 4/1977 | Muller et al. | 138/94.3 |
| 4,054,978 | 10/1977 | Freeman et al. | 285/15 |
| 4,058,328 | 11/1977 | Nickerson et al. | 285/45 |
| 4,119,115 | 10/1978 | Carruthers | 138/94.3 |

FOREIGN PATENT DOCUMENTS

354857 6/1922 Fed. Rep. of Germany ............ 285/45

OTHER PUBLICATIONS

Brochure of WmSon B-W Tere.
Brochure of Marbo.

*Primary Examiner*—Steven L. Stephan
*Attorney, Agent, or Firm*—Arnold, White & Durkee

[57] ABSTRACT

A method and apparatus are disclosed for blocking the flow of fluids through the interior of an elongated pipe section. The apparatus includes a pair of sectional housing members for interconnection around a flanged pipe joint to form an essentially airtight enclosure. Socket members are provided for selectively loosening and tightening bolts on the flanged pipe joint within the enclosure of the housing member, so that a cut-off blind member may be inserted between the pipe joint sections and then clamped in position to block the flow of fluids. Preferably, the assembly further includes a separate sealing ring mechanism which can be inserted between the pipe sections after the blind is removed, to serve as a replacement for the gasket material originally between the pipe sections.

22 Claims, 7 Drawing Figures

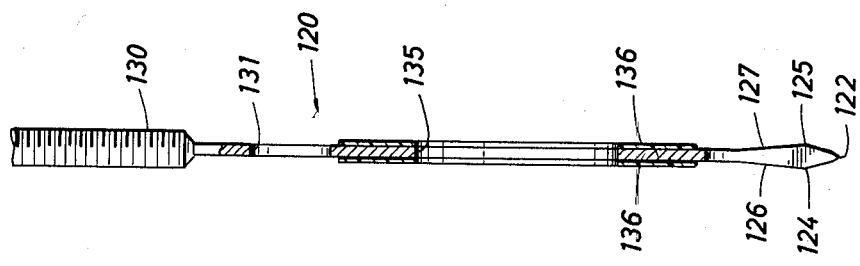
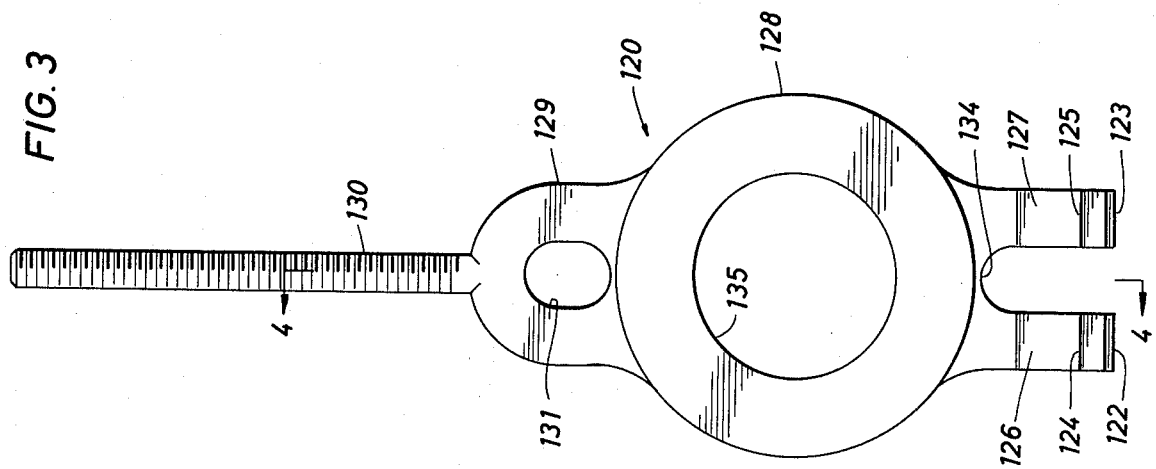
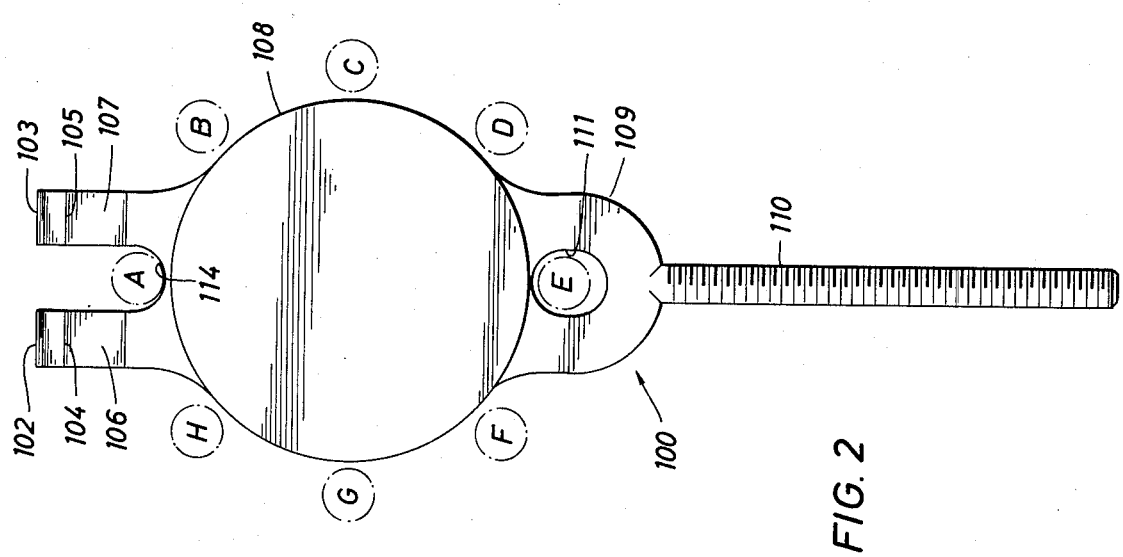

METHOD AND APPARATUS FOR BLOCKING THE FLOW OF FLUIDS THROUGH AN ELONGATED PIPE SECTION

BACKGROUND OF THE INVENTION

1. Field of the Invention

The present invention relates generally to a method and apparatus for blocking the flow of fluids through a pipe section. More particularly, the method and apparatus relates to the insertion of a cut-off blind member between the abutting flanges of a pipe joint in order to achieve the blocking off of fluid flow within the pipe.

2. The Prior Art

Various devices exist in the prior art for blinding off the flow of fluids within a pipe. However, these devices have consistently cut or severed the pipe section in some fashion so that a separate valve element or coupling component could be inserted into the severed pipe section.

For example, U.S. Pat. No. 3,703,906 to Tickett discloses a method and apparatus which includes a cutting element that is rotated around the pipe to sever a pipe section, through which a separate valve assembly is inserted.

U.S. Pat. No. 2,840,100 to Stephenson discloses an assembly which will accommodate the insertion of a tapping machine to form a hole through a pipe section. After the tapping machine is withdrawn from the assembly, separate gate members are then inserted into the interior of the overall assembly so that no gases can escape.

U.S. Pat. No. 3,863,667 to Ward includes a shearing member which cuts a section out of the pipe. Then, a separate piston member covers one pipe section to blind the flow of gases during repair. After the pipe is repaired, a housing assembly must be retained around the severed pipe section in order to maintain a seal once the flow of fluids is reestablished through the pipe. Similar assemblies are shown in U.S. Pat. Nos. 3,833,020 to Smith and 3,867,964 to Gardner.

U.S. Pat. No. 3,687,166 to Herrin likewise discloses an assembly which includes a component that severs a portion of the pipe section to accomplish the flow blockage effect.

Other prior art assemblies are shown by U.S. Pat. Nos. 2,600,497 to Hamer and 4,018,420 to Mueller, which disclose blinding assemblies for connection to a pipe. U.S. Pat. No. 4,119,115 to Carruthers discloses a flow cut-off assembly for use with plastic pipes, but again includes an element for cutting the pipe to establish the blind.

Accordingly, the prior art devices result in numerous disadvantages which are overcome by the present invention. For example, the prior art devices result in a costly operation because, generally, extensive equipment must be retained around the pipe after the flow blockage operation, in order to maintain a seal around the severed pipe section.

SUMMARY OF THE INVENTION

The present invention overcomes these and other disadvantages of the prior art through the various claimed aspects of this invention as related to a method, a kit, and an assembled apparatus.

In the method aspect of the invention, an essentially air-tight chamber is first formed around an elongated pipe section at a position around one of the flanged joints, by assembling an essentially airtight housing at that position with a plurality of housing sections. Then, sockets are displaced through an end portion of the housing and interiorly of the housing in a direction essentially parallel to the centerline of the pipe in order to engage at least some of the connecting bolts around the periphery of the flanged joint. At least some of the bolts are retracted by the sockets to a position out of radial alignment with the abutting edges of the pipe sections, so that a flow cut-off blind may be advanced into a position between the pipe sections to block off fluid flow. Then, the bolts are tightened around the periphery of the joint to clamp the blind between the abutting pipe edges to prevent the leakage of fluid.

Preferably, the method also includes the insertion of a sealing ring between the flanged joint sections after the withdrawal of the cut-off blind member. In this aspect of the method, bolts are first loosened around the pipe joint and then the flow cut-off blind is retracted from its position between the pipe joint. Then, a sealing ring member is advanced in a direction essentially radially of the centerline of the pipe and into a position between the abutting pipe end sections to form a seal. Then, the bolts around the joint are tightened to clamp the sealing ring in position. Finally, the housing is removed from around the pipe and the sealing ring is left in its position.

In the most perferred aspect of the invention, the cut-off blind is interconnected with one of the enclosure housing sections, whereas the sealing ring assembly is interconnected with a separate housing section, such that the two members are essentially diametrically opposed.

In another aspect of the invention, special bolts are provided which can be retained in the sockets during the flow cut-off operation. When employing this aspect of the invention, at least some of the standard bolts at the pipe joint are replaced with the special bolts prior to the assembly of the housing sections around the pipe joint. The special bolts may include a head with a threaded recess to receive a threaded portion of a set screw associated with the sockets.

In another aspect of the invention, sectional retainer plates are provided for placement on the opposite side of the pipe joint from the side receiving the heads of the bolts. These retainer plates, likewise, are placed in position for use prior to the assembly of the housing sections. In one embodiment, the sectional retainer plates collectively include a plurality of threaded openings to receive the threaded bolt shafts. In another embodiment, the retainer plates may include multi-sided recesses to receive nuts of the bolt assembly in order to retain the nuts in position during the flow blockage operation.

In the aspect of the invention related to the kit, various component parts are provided which are capable of being assembled around the pipe section for blocking the flow of fluids. This kit comprises the combination of, first, a pair of housing members adapted to be fitted around the pipe joint to form an essentially air-tight enclosure, with at least one of these members including a drive member for placement in radial alignment with the pipe joint. Each of these members includes a plurality of openings for placement in alignment with the bolts on a pipe joint and a sealing element around the interior periphery of each of the openings. A plurality of socket members are also provided in the kit for axial movement through the plurality of openings in the housing members. Each of these sockets includes a multi-sided recessed end portion for engaging the bolts on the pipe joint, an elongated shaft having an outer cylindrical surface for engagement with the seal on the housing members and a head for accommodating the receipt of a tool to rotate the socket in order to advance and retract the pipe bolts as desired.

A flow cut-off blind is also provided in the kit. This member includes a wedge-shaped leading edge for insertion between the pipe joint to break the seal and a body portion for insertion between the pipe joint to block the flow of fluids internally of the pipe. Further, the cut-off blind may include an element for engagement with a drive member on the housing.

The kit may further include a sealing ring member which may be left in position between the pipe joint section after the removal of the housing sections. The sealing ring member includes a wedge-shaped leading edge to facilitate the insertion thereof between the pipe joint and an annular ring body portion with a sealing material on its outer surface to prevent the escape of fluid when the pipe ends are clamped thereon. The sealing ring will also preferably include an element for engagement with another drive member on the housing sections to accommodate the radial displacement of the sealing ring internally of the assembled housing sections.

In another aspect of the invention, the kit may further include a plurality of kit bolts to replace the standard bolts around the pipe joint. Each of these kit bolts includes an elongated threaded shaft, a multi-sided head adapted to be received in the multi-sided recessed end of the socket and a threaded recess in the head. When these special bolts are provided, the elongated shaft of the socket will also be hollow in order to receive a set screw inserted through the socket shaft for threaded engagement with the recess in the kit bolts, in order to thereby retain the kit bolts on the sockets during use of the kit.

In other aspects of the kit, sectional plates may be provided or alternatively a plurality of special kit nuts may include frusto-conical tapered regions leading into the threaded region in order to guide the kit bolts during use.

The assembled apparatus aspects of the invention are essentially commensurate with the kit aspects.

Accordingly, the present invention provides numerous advantages over the prior art devices. First, the integrity of the pipe section is not diminished in the present invention, because the pipe section is not severed. Second, the present invention is believed to be safer than the prior art devices, because there is no hot tapping or pipe severing involved in the present invention, greatly reducing the chance of an escape of the flowing fluids or ignition of those fluids. Third, the present invention greatly reduces cost, for the following reasons: (a) the sealing ring is the only component which is left in position on the pipe, in contrast to many of the prior art devices which require that an entire housing remain in position around the pipe; (b) no specialists are required to use the present invention, in contrast to some prior art devices which require at least some welding; (c) since the present invention does not require welding, there is no need to run ultrasonic tests to determine the pipe thickness; and (d) the cost of building a plant is reduced because many fewer valves are required in the overall plant system since the present invention now accommodates the blinding off of fluid flow in a quick and simple operation.

These and other meritorious features and advantages of the present invention will be more fully appreciated from the following detailed description and the appended claims.

BRIEF DESCRIPTION OF THE DRAWINGS

FIG. 2 is a frontal view illustrating the configuration of the flow cut-off blind of this invention.

FIG. 3 is a frontal view of a sealing ring component for use in the present invention.

FIG. 4 is a cross-sectional illustration of the sealing ring, as taken along plane 4—4 in FIG. 3.

DETAILED DESCRIPTION OF THE PREFERRED EMBODIMENT

Figure 1:
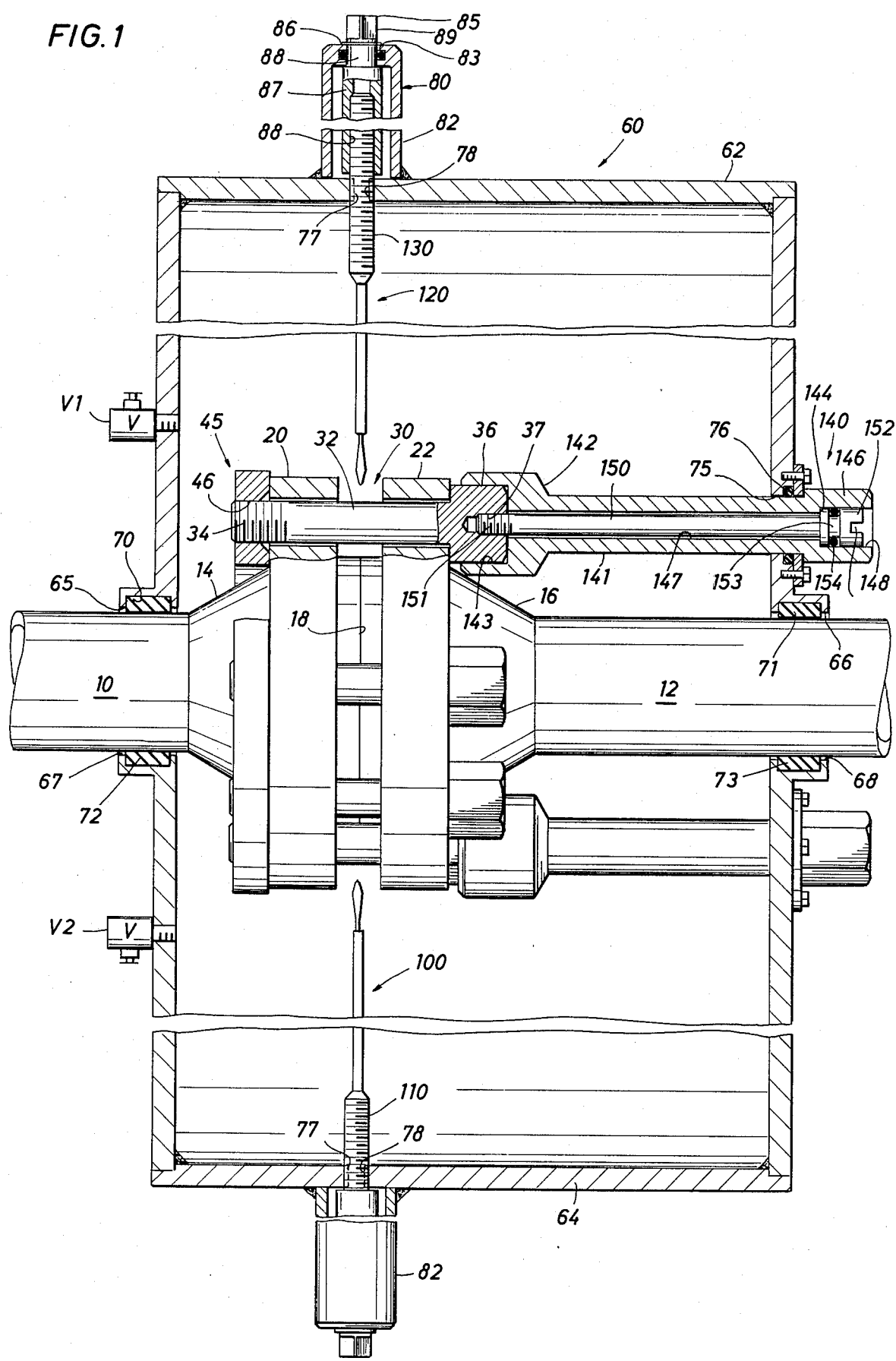
FIG. 1 is a partial cross-sectional, side elevational view of the flow cut-off system of the present invention, as assembled around a flanged pipe joint.

The present invention relates to a system for blinding the flow of fluids through a tubular pipe, by inserting a blind between the abutting ends of two pipe sections at a pipe joint as shown in FIG. 1. This invention may be practiced in method and apparatus aspects, and may also be commercialized in the form of a kit, as will become readily apparent from the following disclosure.

Referring now more particularly to FIG. 1, two pipe sections 10 and 12 are illustrated to include respective weld necks 14 and 16 which abut along a pipe joint 18. As is typical, the pipe sections are joined together by bolts extending through respective flanges 20 and 22 on each section. Although not shown, a packing material, such as asbestos, is conventionally positioned between the abutting ends of the pipe sections in order to enhance the seal.

A first optional, but preferable, step in the present invention is to replace the conventional bolts at the pipe joint with specialized bolts proposed by the present invention which may be retained within a socket member during the blinding operation. These bolts are illustrated best in both FIGS. 1 and 6. As shown in those figures, the bolts 30 include a conventional elongated shaft 32 threaded at one end as illustrated by reference numeral 34, and includes an enlarged hexagonal head 36 at the other end. The specialized feature of the bolt 30 is an internally threaded recess 37 within the head 36, for the purpose that will be more fully explained in later portions of this disclosure.

As an additional optional feature of this invention, specialized nuts 38 may be provided. These nuts include a conventional internally threaded region 39 and the specialized feature of a tapering, frusto-conical lip 40 for the purpose of guiding the shafts 30 into the threaded region 39 upon the repeated withdrawal and insertion during the use of this invention.

Figure 7:
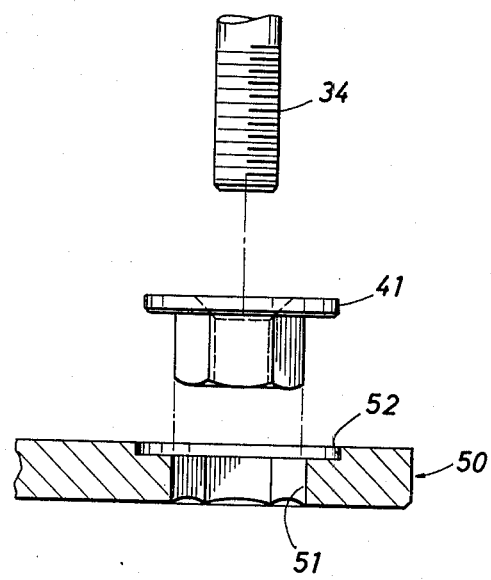
FIG. 7 illustrates an alternative embodiment of a nut for use in this invention and an alternative retainer plate configuration.

FIG. 7 illustrates yet another alternative embodiment of the nut. This embodiment includes the identical features discussed in connection with the prior embodiment, but also includes the additional optional feature of a flange 41.

Figure 5:
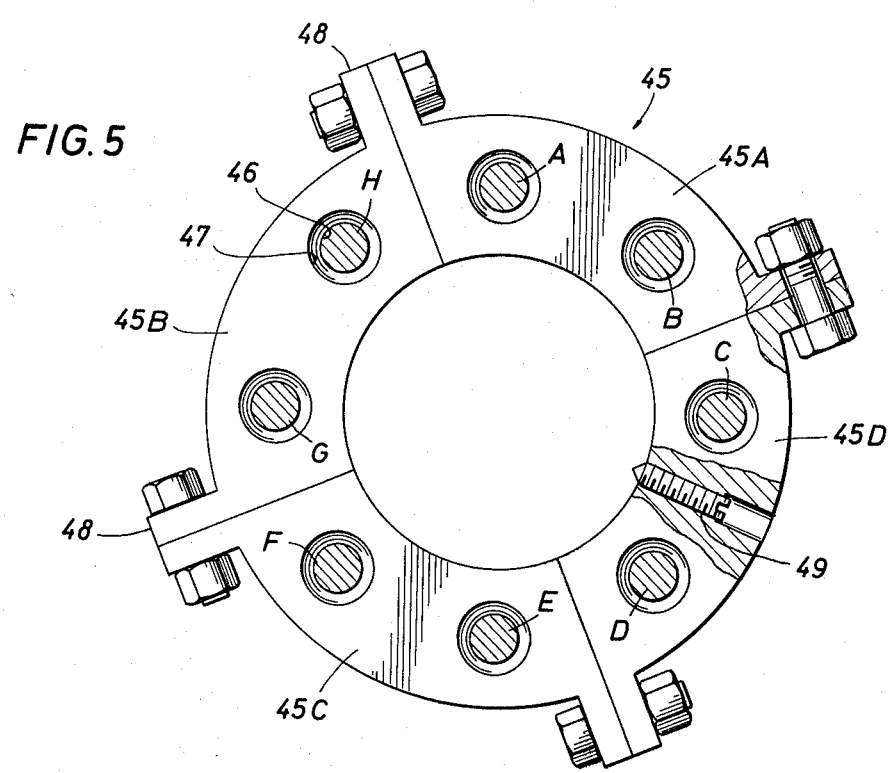
FIG. 5 is an elevational view of one embodiment of the retainer plates used in the present invention.

FIG. 5 illustrates an alternative to the specialized nuts 38. This figure illustrates a retainer plate assembly 45 including four sectional members 45A, 45B, 45C, and 45D. Each of these sections includes a tapered, frustoconical region 47 which blends into a threaded recess 46 for receiving the threaded shafts 34 of the bolt assembly 30. Further, each of the retainer plate sections includes a pair of flanges 48 which are bolted to a flange on the next adjacent member for the purpose of mounting the assembly in position as shown in FIG. 1. One or all of these sections may also include a set screw 49 for the purpose of locking the retainer plate assembly in proper position adjacent the pipe flange 20.

Figure 6:
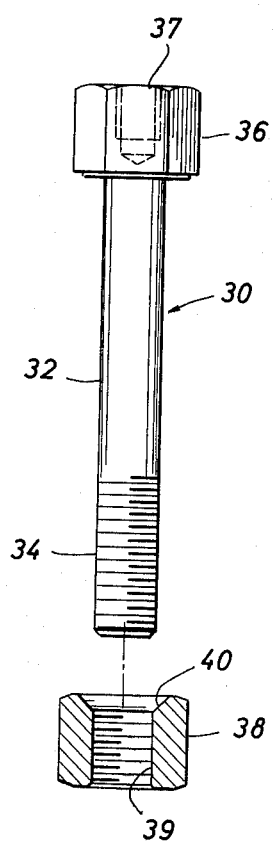
FIG. 6 illustrates a specialized nut and bolt assembly for use in the invention.

In the event that the specialized bolts 38 as shown in either FIGS. 6 or 7 are used, a different retainer plate is preferred in order to retain the nuts in position. Such an assembly is shown in a fragmented illustration in FIG. 7, wherein the retainer plate is shown by reference numeral 50. In this embodiment, each retainer plate section will include a recess 51 having either a 12-point or a hexagonal cross-sectional configuration for the purpose of retaining a nut in position. The retainer plate may also include a cylindrical recess 52 to receive the optional flange 41 on the nut, which will serve the purpose of retaining the nut within the retainer plate.

Referring now more particularly to FIG. 1 again, the invention includes an housing 60 which is placed around the pipe joint in order to establish an essentially air-tight interior enclosure. The housing 60 includes a pair of sectional housing members 62 and 64 which may have a rectangular configuration in a cross-sectional view taken perpendicular to the plane of FIG. 1. These sections respectively include semi-circular recesses 65, 66 and 67, 68 which fit around the pipe, with semi-circular sealing components 70, 71 and 72, 73 being provided respectively in recesses at the semi-circular openings 65, 66, 67 and 68. Although not shown, the housing sections may preferably include a flange along their parting edges, such that the flanges will similarly include sealing components and may be bolted together to form the enclosure around the pipe section.

One housing section, such as 62, may include an optional bleed valve V1 to vent the pressure developed within the housing during the use of this invention, so that there will not be any pressure head during disassembly of the housing sections. Additionally, a separate valve V2 may be provided on one of the sections, such as 64, for the purpose of injecting materials, such as sealing compounds, into the housing compartment, if needed or desired.

One end of each of the housing members 62 and 64 will also preferably include a plurality of openings 75 to receive a socket member as will be more fully disclosed in later portions of this specification. As shown in FIG. 1, each opening 75 will preferably include a sealing element 76.

Additionally, each housing member will preferably include a drive member 80 and 82, respectively which are preferably identical in construction. Each driving member will include a cup-shaped housing 82 welded to a wall of the enclosure structure in a position which will be placed essentially in radial alignment with the abutting edges 18 of the pipe sections. The housing 82 includes an opening 83 at its end, through which a drive component 85 is inserted and retained in place in a conventional manner, such as by a snap ring as shown by reference numeral 86. The drive component 85 includes a tubular shaft section 87 having an internally threaded recess 88 for the purpose that will be more fully explained later. The shaft portion 87 is integral with a reduced cylindrical portion 88 extending through opening 83 and terminating in a multi-sided head 89, upon which may be mounted a conventional hand wheel (not shown) or which may be engaged by a tool such as a wrench.

The invention further includes a flow cut-off blind member 100 and a sealing ring component 120 shown in FIGS. 1, 2, and 3. FIG. 4 illustrates a cross-sectional view of the sealing ring 120, but may also be taken to represent the cross-sectional configuration of the blind 100 since the blind and sealing ring are essentially identical except for an opening through the sealing ring to permit the flow of gases.

Referring more particularly to FIGS. 2, 3, and 4, both the blind 100 and the sealing ring include respective bifurcated leading edges 102, 103 and 122, 123 which are wedge-shaped in cross-section for the purpose of providing a surface that can be more readily forced between the parting edges 18 of the pipe sections. These wedge-shaped surfaces taper outwardly to a region 104, 105 and 124, 125, where reverse tapering surfaces 106, 107 and 126, 127 are provided. These reverse tapering surfaces on the blind 100 serve a dual function of providing a wedge to assist in forcing the pipe edges apart when the blind is withdrawn and also the purpose of leading into a reduced metal cross-sectional area upon which a gasket material is provided to establish a seal when the pipe sections are clamped upon the blind. The reverse tapered surfaces 126 and 127 on the sealing ring 120 provide essentially only the latter function, since this member may be left in position between the pipes to serve as a sealing component after the blinding operation is completed.

Blind 100 further includes a body portion 108 having a size and configuration generally larger than the internal flow path within the pipe section, so that the flow path may be totally obstructed. This body portion 108 is integral with an enlarged tail region 109, which is likewise integral with an elongated threaded shaft 110. As shown, the tail 109 includes an enlarged recess 111. As will be more fully explained below, a bolt may be inserted through this recess 111 and between the bifurcated leading edge region in order to bolt the pipe joints together.

The sealing ring 120 likewise includes an annular body portion 128 including an opening 135 corresponding essentially to the size and configuration of the internal flow path in the pipe. This body portion similarly blends into an integral tail 129 which similarly includes a cutout 131 and is integral with an elongated threaded shaft 130.

As shown in FIG. 4, a sealing material 136, such as Teflon, is preferably provided on both sides of the body region 128. A similar material is also preferably provided on both sides of the body 108 of the blind component 100.

Referring back again to FIG. 1, the blind 100 and the sealing ring 120 are illustrated as positioned in alignment with the abutting edges 18 of the pipe sections 10 and 12. The shaft 130 of the sealing ring 120 is shown as being threadedly received within the interior threaded recess 88 of drive member 80. As will be appreciated, rotation of the threaded drive member 85 will effect an axial displacement of the sealing ring 120. Although not shown, the threaded shaft 130 of the sealing ring and similarly the threaded shaft 110 of the blind 100 may include diametrically opposed grooves, into which tab extensions 77 and 78 may extend from the housing section 62 and 64 for the purpose of maintaining the blind and the sealing ring in proper orientation and for assuring that these components move essentially axially upon the rotation of the corresponding drive members.

The invention further includes a plurality of sockets 140 which are inserted within the openings 75 in the housing members 62 and 64, for placement in alignment with the bolts 36. Each socket preferably includes an elongated shaft 141 having an exterior cylindrical surface and terminating at its opposite ends in enlarged head regions 142 and 146. Head 142 includes an outwardly facing multi-sided recess 143, which may have either a hexagonal or a 12-point configuration in cross-section, for the purpose of receiving the enlarged multi-sided head of the bolt 30. The head 146 preferably includes a multi-sided exterior configuration, such as hexagonal, so that a tool such as wrench may be received on the head in order to apply torque to the bolts 30 for their insertion and retraction.

In the most preferred embodiment, the shaft 141 is tubular to include an interior elongated recess 147 and an enlarged cylindrical recess 148 in the head 146. As shown, a shoulder 149 is formed at the position where the elongated cylindrical recess 147 opens into the enlarged recess 148.

These recesses enable the use of an elongated set screw 150, which includes an elongated shaft with a threaded end region 151. At the other end, an enlarged head 152 is integral with the elongated shaft, and includes an annular recess 153 to receive a sealing O-ring 154. Additionally, a hexagonal recess 155 is provided in the end of head 152, so that a tool, such as an Allen head wrench, may be used to rotate the set screw into position.

As will be appreciated, the threaded end of the set screw 150 mates with the threaded interior recess 37 of the bolts 36. With this arrangement, each socket may be positioned in engagement with a bolt, and then the set screw 150 may be inserted through the socket to thread into the bolt so that the bolt will not inadvertently fall out of position during the operation of this invention.

In practicing this invention, the first step is to replace at least some of the bolts around the pipe joint with the specialized bolts shown in FIGS. 1 and 6. Referring to FIGS. 2 and 5, where the eight bolt positions have been lettered respectively A-H, it is preferable to replace bolts A, B, D, E, F and H one at a time. The conventional bolts at positions C and G may be either loosened or taken out of position, since these bolts are along a parting line of the housing sections 62 and 64 and therefore socket members are not provided at these positions because of the difficulty to maintain a seal.

During the installation of the specialized bolts 30, the retainer plate assembly 45 will likewise be installed, such that the bolts are either threaded into the threaded recesses 46 of the retainer plate assembly as shown in FIG. 5, or alternatively, the bolts will be threaded into nuts as shown in FIGS. 6 and 7 which will be retained in position by a retainer plate assembly.

Next, the housing sections 62 and 64 will be placed in position such that the blind 100 and the sealing ring 120 are in radial alignment with the parting edges 18 and such that the sockets 140 are in alignment with each of the bolts 30. The housing sections will be bolted in position, or otherwise clamped together, to establish the essentially air-tight enclosure around the pipe joint.

Then, the six sockets at positions A, B, D, E, F, and H are axially inserted to fit over the head 36 of the bolts. When these sockets are properly positioned, the set screws 150 are then inserted through the interior of the sockets and threaded into the recesses 37 on the bolts. Set screws 150 should ideally be designed so that the head 152 will bottom out on shoulder 149 to assist in maintaining the seal through this region, in conjunction with the sealing ring 154.

Next, sockets at positions A, B, and H should be rotated to retract the bolts 30 at these positions slightly, for example ¼ of an inch, but to retain the threaded end portions 34 in the retainer plates. This slight retraction will enable the pipe joint to be forced apart, but will prevent the pipe section from coming apart or canting. At the same time, sockets at positions D, E, and F should be rotated to retract the bolts 30 at these positions. Then these sockets should be retracted to withdraw the bolt shaft 32 such that the threaded region 34 does not obstruct the space between flanges 20 and 22 so that the blind 100 may be axially inserted through that region and between the pipe joint sections 18.

The blind 100 is axially advanced by operating the drive member as previously discussed. The wedge-shape leading edges 102 and 103 will be inserted at the parting line 18 and will serve to break the seal previously established between the pipe sections 10 and 12. Advancement of the blind will continue until surface 114 between the bifurcated leading edges strikes the bolt at position A. Preferably, the blind should then be retracted for example by about an ⅛ of an inch so that the threads on the bolt at position A will not be stripped during retightening. As will be appreciated, in this position, the body portion 108 of the blind will be between pipe sections 10 and 12 to totally block the flow of fluids.

Then, the bolts at positions A, B, and H are tightened, along with the bolts at positions D, E, and F being resinserted through flange 20 and then to the retainer plate for tightening in order to reestablish the seal between the pipe sections. Most preferably, all these bolts will be retightened using a conventional cross over method.

With the blind in position between the pipe sections, valve VI may be opened to vent the internally developed pressure resulting from escaping fluids during insertion of the blind.

More importantly, with the blind in position, a malfunction downstream in the direction of flow may be corrected. Once such an operation is complete, it is then desirable to reestablish flow through the pipe line and to reestablish a seal between pipe sections 10 and 12. This is accomplished by loosening the bolts at positions A, B, and H and by withdrawing the bolts at positions D, E, and F as previously described. Then, drive member 82 is operated to retract the blind 100. The bolts at positions D, E, and F are then reinserted and threaded into position, but not tightened down. The bolts at positions A, B, and H are then rotated to retract them from the retainer plate assembly and withdrawn to a position so that the threaded heads 34 are within the openings through flange 22. With all the bolts in this position, the sealing ring 120 is then advanced by operating drive member 80. As will be appreciated, the leading edges 122 and 123 on the sealing ring force the pipe sections apart so that the body 128 of the sealing ring may be inserted in position. Advancement of the sealing ring will continue until surface 134 between the bifurcated regions engages the bolt at position E, and similarly the sealing ring will then be retracted slightly, such as about an ⅛ of an inch, so that the threads on the bolt at that position will not be stripped. The bolts at positions D, E, and F are then tightened back down while the bolts at positions A, B, and H are reinserted and bolted into position in the retainer plate, with bolt A extending through the opening 131 in the sealing ring.

The flow cut-off assembly may now be dismantled, with the sealing ring being the only component that is left in position. All the other components are reusable, except possibly for the blind in the event that the sealing surfaces are damages during insertion or withdrawal between the pipe sections. After the dismantling of the housing sections, the conventional bolts may be replaced around the pipe flange, so that the retainer plates and the specialized bolts may likewise be reused.

It will be apparent to those skilled in the art that various modifications may be made to the present disclosure, without departing from the true spirit of the invention. For example, various alternatives may be used in lieu of the disclosed socket and set screw arrangement. For example, the set screw may be eliminated and the socket designed to include a snap-lock arrangement or be magnetized in order to retain the bolts in position. Of course, if that modification is made, a specialized bolt is unnecessary. Other such modifications may be made to this invention, which is limited only by the following claims.

Having therefore completely and sufficiently described our invention, we now claim:

1. In a method for blocking off the internal flowpath in a tubular pipe length formed by a plurality of pipe sections connected at flanged joints by bolts, the steps of:
    (a) forming an essentially airtight chamber around the pipe length at a position around one of the flanged joints by assembling an essentially airtight housing at that position;
    (b) displacing a plurality of sockets interiorly of the housing in a direction essentially parallel to the centerline of the pipe at the joint to engage a plurality of said connecting bolts;
    (c) retracting at least some of the connecting bolts by said sockets to a position out of radial alignment with the abutting edges of the pipe sections at said joint;
    (d) advancing a flow cut-off blind in a direction essentially radially of the centerline of the pipe section such that the blind is displaced through the region previously obstructed by bolts prior to the performance of Step (c) and then into the interior of the pipe section to block the internal flowpath; and
    (e) tightening the bolts at said joint to clamp the blind between the abutting pipe edges.

2. The method as defined in claim 1, including the additional steps subsequent to Step (e) of:
    (f) loosening at least some of the connecting bolts at the pipe joint;
    (g) retracting the flow cut-off blind from its position between the pipe joint;
    (h) advancing a sealing ring member in a direction essentially radially of the centerline of the pipe and into position between the abutting pipe end sections;
    (i) tightening the bolts at said joint to clamp the sealing ring between the abutting pipe edges; and then
    (j) removing the housing from around the pipe joint sections.

3. The method as defined in claim 2, characterized in Step (f) by retracting those same bolts which were retracted in Step (c) so that the blind may be retracted through the same region of its advancement.

4. The method as defined in claim 3, characterized by advancing the sealing ring during Step (h) in a direction essentially opposite to that in which the blind is advanced during the performance of Step (d), and further including the steps prior to the performance of Step (h) of:
    advancing the retracted bolts back into position in at least a slightly tightened condition; and
    retracting other bolts in alignment with the travel of the sealing ring to a position out of radial alignment with the abutting edges of the pipe sections to accommodate insertion of the sealing ring.

5. The method as defined in claim 4, further including the step prior to the performance of Step (a) of replacing at least some of the standard bolts at the pipe joint with a bolt having a head with a threaded recess, and Step (b) being characterized by threading a set screw associated with each socket into the threaded head of each respective bolt in order to retain the bolts in the sockets during the performance of the other steps.

6. The method as defined in claim 5, further including the step prior to the performance of Step (a) of attaching a plurality of sectional retainer plates to the pipe joint to retain the nuts of the bolt assembly in position during the performance of the other steps.

7. The method as defined in claim 5, characterized by attaching a plurality of sectional retainer plates to the pipe joint while replacing the bolts, with the retainer plates including threaded openings to receive the threaded bolt shafts.

8. The method as defined in claim 5, characterized by the airtight housing including a pair of sectional members which are connected to opposite sides of the pipe flange along a parting line between the sections, and further including the step prior to the performance of Step (a) by retracting the conventional bolts that are radially aligned with the parting line without replacing those bolts with the recessed head bolts.

9. A kit having component parts capable of being assembled around a pipe joint in the field for blocking the flow of fluids through a pipe section so as to enable the repair of the pipe at a position downstream from the point of the kit assembly, the kit comprising the combination of:
    a pair of housing members adapted for interconnection around a pipe joint to form an essentially airtight enclosure, at least one housing member including a drive member for placement in essentially radial alignment with a pipe joint, each member including a plurality of openings for placement in alignment with bolts on a pipe joint, and a sealing element around the periphery of each opening;
    a plurality of sockets for each housing member adapted for axial movement through the openings in the housing members for advancement and retraction internally of the airtight enclosure in a direction essentially parallel to the centerline of the pipe in order to retract and tighten bolts around the periphery of the pipe joint during use of the kit, each socket including (a) a multi-sided recessed end portion for engaging the bolts on the pipe joint, (b) an elongated shaft having an outer cylindrical surface for engagement with the sealing element on the housing members and (c) a head for accommodating the receipt of a tool, such as a wrench, exteriorly of the housing member to rotate the socket under force to advance and retract the pipe bolts; and a flow cut-off blind including (a) a tapered, wedge-shaped leading edge for insertion between the pipe joint to break the seal, (b) a body portion for insertion between the pipe joint to block the flow of fluids internally of the pipe, and (c) a driven member for engagement with the drive member on the housing to advance the blind in essentially a radial direction with respect to the pipe centerline.

10. The kit as defined in claim 9, further characterized by each of said housing members having a drive member, and further including:

a sealing ring member including (a) a tapered leading edge to facilitate the insertion thereof between the pipe joint, (b) an annular ring body portion having a sealing material thereon to prevent the escape of fluids when the pipe ends are clamped thereon, and (c) a driven member for engagement with the other drive members on the housing members to advance the sealing ring member in essentially a radial direction with respect to the centerline of the pipe.

11. The kit as defined in claim 10, characterized further by the body portion of the blind including a sealing material to prevent the escape of fluids when the pipe ends are clamped thereon.

12. The kit as defined in claim 11, characterized by at least one of the housing members including a bleed valve to release the internally developed pressure during the disconnection of the pipe joint.

13. The kit as defined in claim 9, further including a plurality of kit bolts to replace the standard bolts around the pipe joint, wherein each kit bolt includes (a) an elongated threaded shaft, (b) a multi-sided head adapted to be received in the multi-sided recessed end of a socket and (c) a threaded recess in the head, characterized by the elongated shaft of the socket being hollow and further including a plurality of set screws for insertion through the socket shafts for threaded engagement with the recess of the kit bolts in order to retain the kit bolts on the sockets during use of the kit.

14. The kit as defined in claim 13, further including a plurality of sectional plates adapted for interconnection around the pipe adjacent a pipe joint flange, the sections collectively having a plurality of threaded recesses to receive the threaded shafts of the kit bolts.

15. The kit as defined in claim 14, characterized by the retainer plates including a frusto-conical taper around each of the threaded recesses to guide the shaft of the kit bolts during their insertion into the threaded recesses.

16. The kit as defined in claim 13, further including a plurality of kit nuts to replace the standard nut on the pipe flange, the kit nuts including a frusto-conical taper blending into a threaded recess to guide the shaft of the kit bolts during their insertion into the threaded recesses.

17. An assembly for blocking the flow of fluids through a pipe section, comprising:

a plurality of housing sections for assembly around a flanged pipe joint section;

at least one of the housing sections including a drive member for placement in essentially radial alignment with the pipe joint when the housing members are assembled, and the housing sections collectively including a plurality of openings for placement in alignment with the bolts on a pipe joint;

a socket member mounted within each of the openings in the housing sections for essentially axial movement, with each socket including (a) an end portion for engaging the bolts on the pipe joint, (b) an elongated shaft extending through an opening in the housing, and (c) a head for accommodating the receipt of a tool exteriorly of the housing to rotate the socket in order to advance and retract a pipe bolt; and a flow cut-off blind interconnected with the drive member on the housing sections for essentially radial displacement, the blind including a body portion for insertion between the pipe joint to block the flow of fluids internally of the pipe.

18. The assembly as defined in claim 17, characterized by the blind further including a wedge-shaped leading edge for insertion between the pipe joint to break the seal.

19. The assembly as defined in claim 17, further including a second drive member on another of the housing sections and a sealing ring member removably interconnected with said second drive member, the sealing ring member including a wedge-shaped leading edge to facilitate the insertion thereof between the pipe joint and an annular ring body portion having a sealing material thereon to prevent the escape of fluids when the pipe ends are clamped thereon.

20. The assembly as defined in claim 17, further including a plurality of sectional plates for assembly around a pipe adjacent the pipe joint flange, such that the sections collectively include a plurality of threaded recesses to receive the threaded shafts of bolts on the pipe joint flange.

21. The assembly as defined in claim 19, further including a plurality of sectional plates for interconnection around the pipe adjacent a pipe joint flange, such that the sections collectively include a plurality of multi-sided recesses to retain the nuts of the bolt assemblies in place during retraction and reinsertion of the bolts during use of the assembly.

22. The assembly as defined in claim 17, characterized by the shafts of the sockets being hollow, and further including a set screw including an elongated shaft threaded at one end and an enlarged head at the other end, such that the threaded shaft end may be received in a complementary-shaped recess on each of the bolts at the pipe joint in order to retain the bolts in the socket during use of the assembly.

* * * * *